(12) United States Patent
Heinrich et al.

(10) Patent No.: US 6,199,167 B1
(45) Date of Patent: Mar. 6, 2001

(54) COMPUTER ARCHITECTURE WITH PASSWORD-CHECKING BUS BRIDGE

(75) Inventors: David F. Heinrich, Tomball; Harry Q. Le, Katy; Richard O. Waldorf, Cypress; Michael F. Angelo, Houston, all of TX (US)

(73) Assignee: Compaq Computer Corporation, Houston, TX (US)

( * ) Notice: Subject to any disclaimer, the term of this patent is extended or adjusted under 35 U.S.C. 154(b) by 0 days.

(21) Appl. No.: 09/047,789

(22) Filed: Mar. 25, 1998

(51) Int. Cl.[7] .................................................. G06F 12/16
(52) U.S. Cl. .......................... 713/202; 713/200; 380/4
(58) Field of Search ............................. 713/200, 201, 713/202; 714/38, 36; 711/164; 380/4

(56) References Cited

U.S. PATENT DOCUMENTS

| | | |
|---|---|---|
| 5,377,343 | 12/1994 | Yaezawa . |
| 5,388,156 | 2/1995 | Blackledge, Jr. et al. . |
| 5,421,006 | 5/1995 | Jablon et al. . |
| 5,451,934 | 9/1995 | Dawson et al. . |
| 5,533,125 | 7/1996 | Bensimon et al. . |
| 5,537,540 | 7/1996 | Miller et al. . |
| 5,537,544 | * 7/1996 | Morisawa et al. ................ 713/202 |

OTHER PUBLICATIONS

"PCI BUS Power Management Interface Specificaiton", Version 1.0, Jun. 30, 1997, PCI Local BUS, 65 pages.
"Network PC System Design Guidelines", by Compaq, Dell, Hewlett Packard, Intel and Microsoft Corp., Version 1.0b, Aug. 5, 1997, 144 pages.
U.S. Patent application Ser. No. 08/693,458 filed Aug. 7, 1996, P–1097, "Method and Apparatus for Secure Execution of Software".
Collins, Robert, "Intel's System Management Mode", url www.x86.org/ddj/Jan97/Jan97.html downloaded Nov. 5, 1997.
Greenleaf, Graham, "Privacy Implications of Digital Signatures", url www/anu.au/people/Roger.Clarke/DV/DigSig.html, downloaded Nov. 5, 1997.

* cited by examiner

Primary Examiner—Ly V. Hua
(74) Attorney, Agent, or Firm—Conley, Rose & Tayon, P.C.

(57) ABSTRACT

A computer password security method employing a south bridge circuitry where the user password is compared to a secured password stored in secured memory which is directly accessible to the south bridge circuitry, removing any threat of data bus and/or unprotected memory snooping.

66 Claims, 6 Drawing Sheets

COMPUTER ARCHITECTURE WITH PASSWORD-CHECKING BUS BRIDGE

BACKGROUND AND SUMMARY OF THE INVENTION

This application is related to computer systems and security passwords.

Computer Passwords

The widespread commercial use of computers in society today has generated a market for a number of security schemes to ensure that access to data and hardware are protected against unauthorized access and theft. The most common method for restricting access to systems is with the use of passwords. However, current methods of password security are susceptible to password-interception by snooping keystrokes as they are entered into memory. In this context, snooping may be defined as the unauthorized interception of information, as it is being transmitted from one process or component to another by a third process or component. Snooping may occur by using software applications designed specifically for capturing or displaying memory data (e.g. hacking programs), or perhaps by connecting electronic equipment which may read and interpret bus or port digital traffic. CMOS-based passwords, in extensive use in computer systems, can be snooped. In many computing systems, a user may define a start-up password which may restrict operation of the machine and is stored in nonvolatile memory such as flash or EEPROM. The comparison of the user input password and the predefined password may occur in unprotected memory which may be snooped. Moreover, passwords stored in CMOS memory can be easily defeated by simply removing the battery supplying the voltage to the CMOS memory.

Another approach applied to enhance system security uses System Management Mode ("SMM") to let the microprocessor perform functions independent of the operating system environment, or the operating mode. See U.S. patent application Ser. No. 08/693,458, filed Aug. 7, 1996, A Method and Apparatus for Secure Execution of Software (Compaq application number P1097), hereby incorporated by reference. SMM may be used to protect a hard disk from viruses. However, some viruses may capture a password in memory before it is overwritten with other data. Therefore, if SMM password security has been breached, virus protection may not be able to be implemented. Additionally, future systems may not incorporate SMM, thereby requiring a change in design to restore security features.

Hash Functions

Alternative methods of password protection include the use of "hash" functions. Hash functions have been used in computer science for some time. A hash function is a function that takes a variable-length input string (called a "pre-image") and converts it to a fixed-length (generally smaller) output string (called a "hash value"). A simple hash function would be a function that takes the pre-image and returns a byte consisting of the logical XOR of all the input bytes. However, a hash function is public; there is no secrecy to the process. Given a particular byte value, it is trivial to generate a string of bytes whose XOR is that value. The point here is to fingerprint the pre-image: to produce a value that indicates whether a candidate pre-image is likely to be the same as the image. Because hash functions are typically many-to-one, they cannot be used to determine with certainty that the two strings are equal, but can be used to get a reasonable assurance of accuracy.

Microprocessor Support Chipsets

The CPU normally requires a number of support chips to handle buffering of data from memory, interfacing to legacy architectures, and caching and bus arbitration. These functions are managed by custom-designed chipsets which perform a "bridging" function. More specifically, a bridging device may provide a connection between two independent buses.

Figure 1:
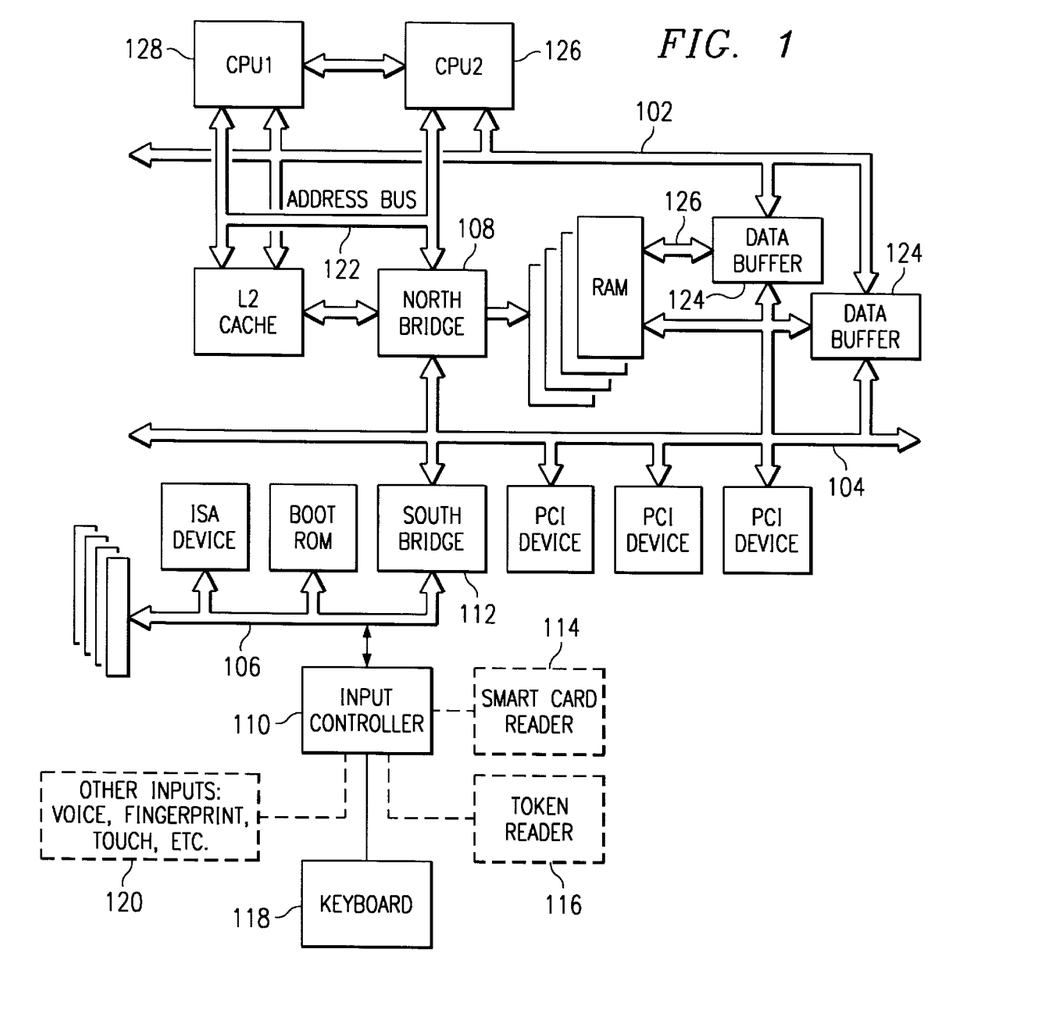
FIG. 1 shows a block diagram of a typical microprocessor support chipset architecture in a computer system.

FIG. 1 shows a typical design where bridging occurs between the host processor bus 122 and the PCI bus 104, between the PCI bus 104 and a standard expansion bus 106 (such as ISA or EISA), and between two PCI buses, 102 and 104. For example, a host/PCI bridge 108 may take various actions based upon an action initiated by the CPU 126; if the CPU is performing a main memory read/write, the bridge 108 takes no action; if the CPU is targeting a device memory located on a bus behind the bridge, the bridge 108 must act as a surrogate target of the CPU's transaction; if the CPU 126 accesses a PCI device configuration register, the bridge 108 must compare the target bus to the range of PCI buses that exist beyond the bridge, and initiate a transaction message based upon the location of the targeted bus. This particular rendition shows a multi-processor implementation using two processors, 126 and 128.

One popular support chipset is the VL82C59x series designed by VLSI Technology. A function of the "south bridge" 112 (e.g. VLSI82C593 chip) is to provide bridging between, for example, an ISA bus 106 and the PCI bus 104. The south bridge chip 112 may also bridge other bus architectures (such as USB and 1394) to the PCI bus 104. An input controller 110 is shown connected to the south bridge chip 112, by way of a bus 106. A variety of input devices may be used to provide the user input; a smart card reader 114, token reader 116, a standard keyboard 118, and other more sophisticated devices such as voice recognition and fingerprint readers 120. A function of the "north bridge" chip 108 (e.g. VLSI 82C591 CPU system controller) is to provide bridging between a host microprocessor local bus 122 and the PCI bus 104. The bridge 108 may also provide transaction translation in both directions. Lastly, a function of the data buffer 124 (e.g. VLSI 82C592) is to provide bridging between the host data bus 102, system memory data bus 126, and the PCI data bus 104. Other popular support chipsets include, for example, Intel 440 and 430 series.

Architecture with Password-Checking Bridge

This application discloses a method for enabling secure password communications without exposing a password to snooping. It provides an enhancement to bridge chip features that allows the password to be checked in a more secure environment (the bridge chip) before any operation on the system side is enabled. This memory can be used, for example, to store passwords and enabler bits, such as bits to allow for flash or EISA configuration modifications, or even a "hoodlock" (which prevents anyone from opening the case without a password). This innovative design solves the issues surrounding secure communication of passwords to the system. It also enables several functions that previously required power-cycles in order to protect the transactions.

An advantage is that the innovative method eliminates access to the password by providing a dedicated environment in which the password is checked.

BRIEF DESCRIPTION OF THE DRAWINGS

The disclosed inventions will be described with reference to the accompanying drawings, which show important sample embodiments of the invention and which are incorporated in the specification hereof by reference, wherein.

DETAILED DESCRIPTION OF THE PREFERRED EMBODIMENTS

The numerous innovative teachings of the present application will be described with particular reference to the presently preferred embodiment. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Figure 2:
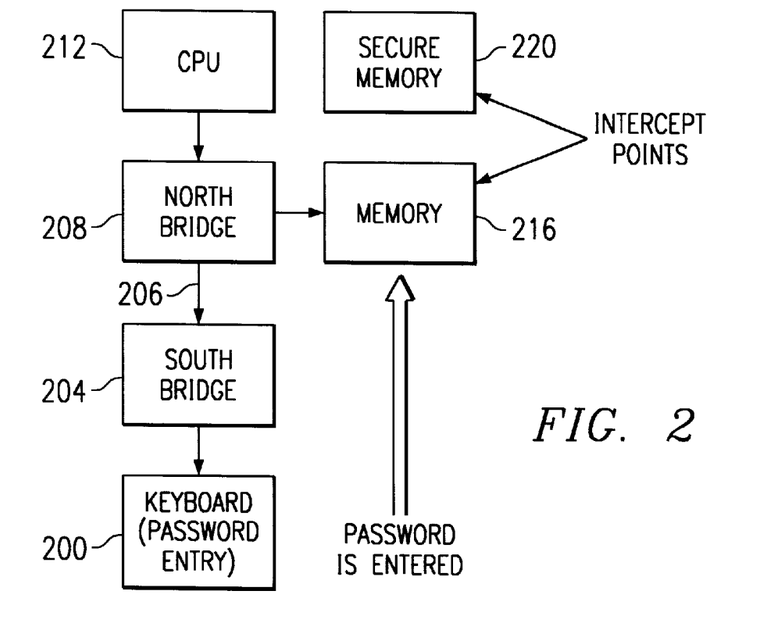
FIG. 2 shows a block diagram of a typical password transaction exchange in a computer system.

FIG. 2 shows a typical method of a password transaction when using password protection in a computer. The user enters the password at the keyboard 200 or via some other input mechanism. The password data is passed to the south bridge architecture 204 and across a peripheral bus 206 (PCI bus, in this case) to the north bridge architecture 208. The north bridge circuitry 208 interfaces to the system CPU 212 and sends the password into system memory 216 for storage, where the actual comparison takes place. The secure memory 220 is a non-volatile memory and contains the secured password at all times. The secured memory password is pulled from secured memory 220 and compared with the user-entered password. If a successful match is obtained, various functions of the system are enabled for the user. If the match is unsuccessful, system functions may be downgraded or even disabled. Potential "intercept points" where the password is at risk for being snooped are the secure memory 220 and memory 216. Generally, the more buses the password is transmitted across, the greater opportunity for snooping it.

Figure 3:
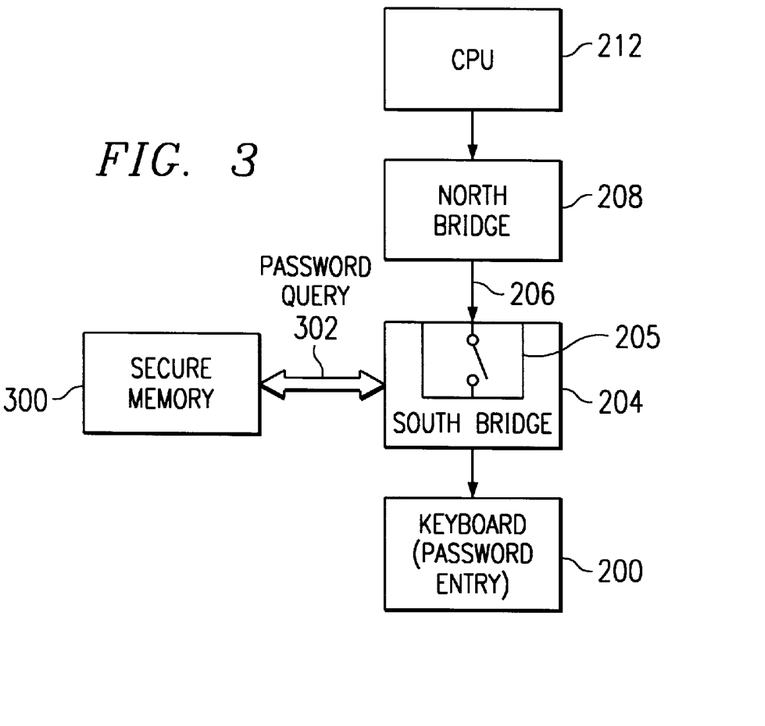
FIG. 3 shows a block diagram of a password transaction using the presently preferred embodiment.

FIG. 3 shows an innovative method for protecting the system password. The user inputs a password through the keyboard 200 or any other type of input device. The password is passed to the south bridge circuitry 204 where the comparison takes place. A "secure" memory 300 (memory dedicated for the purpose of retaining a predefined password) contains the system password and is queried directly by a dedicated interface 302 to the south bridge circuitry 204. The dedicated interface 302 is not readily accessible by snooping devices. Furthermore, the password is not passed across a legacy ISA bus where it may be snooped. Additionally, the password is not passed through the south bridge 204 across, for example, a PCI bus 206 to the north bridge 208. Any data transmitted across the PCI bus may also be snooped. If the user password is validated, a circuit 205 located within the south bridge 204 circuitry is enabled, and system operation may be allowed. Otherwise, an invalidated user password results in the circuitry 205 remaining disabled, and system operation prohibited.

Figure 5A:
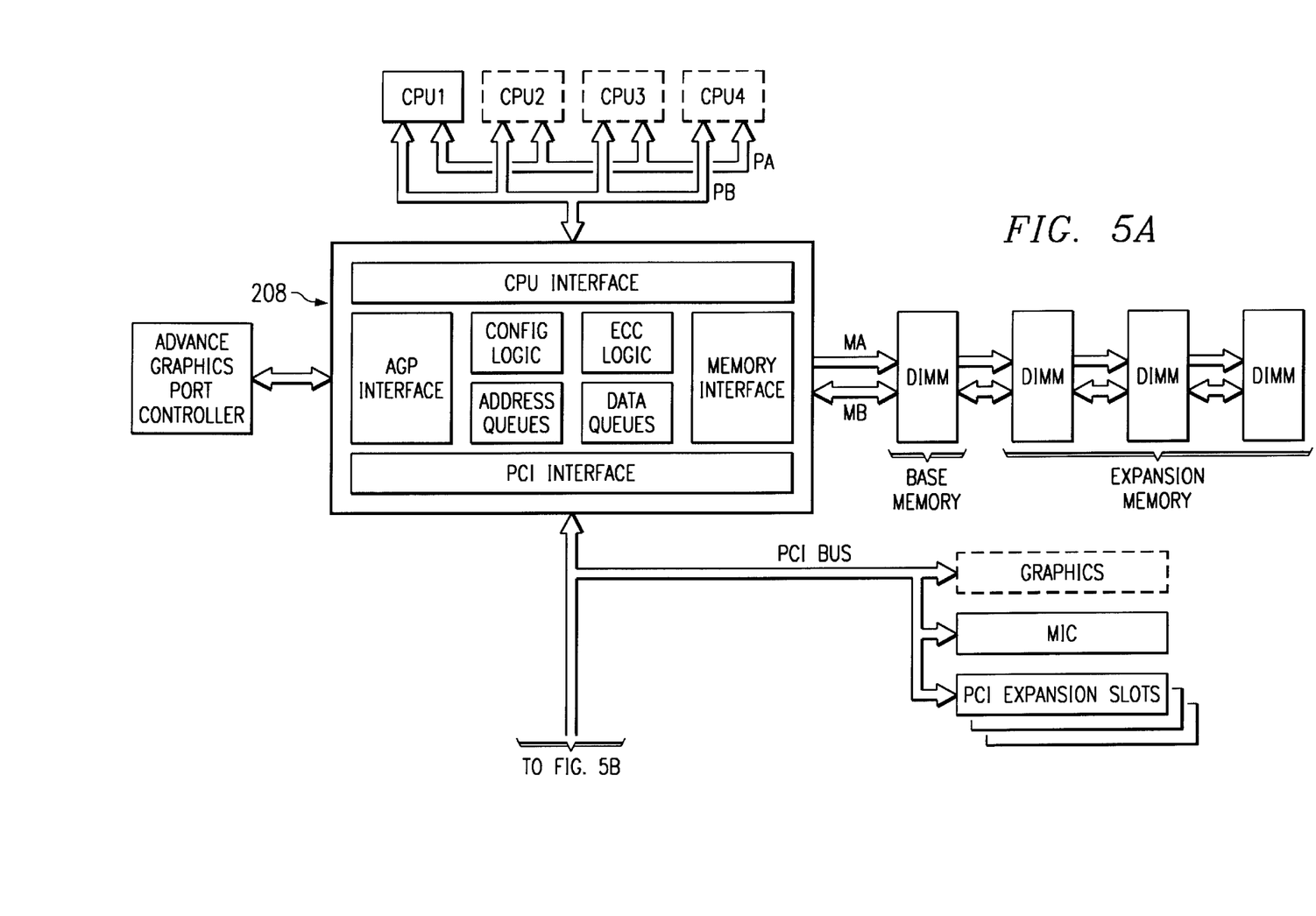
FIGS. 5A and 5B show a generalized block diagram of a computer with an innovative Compaq ASIC incorporating the innovative security function.
Figure 5B:
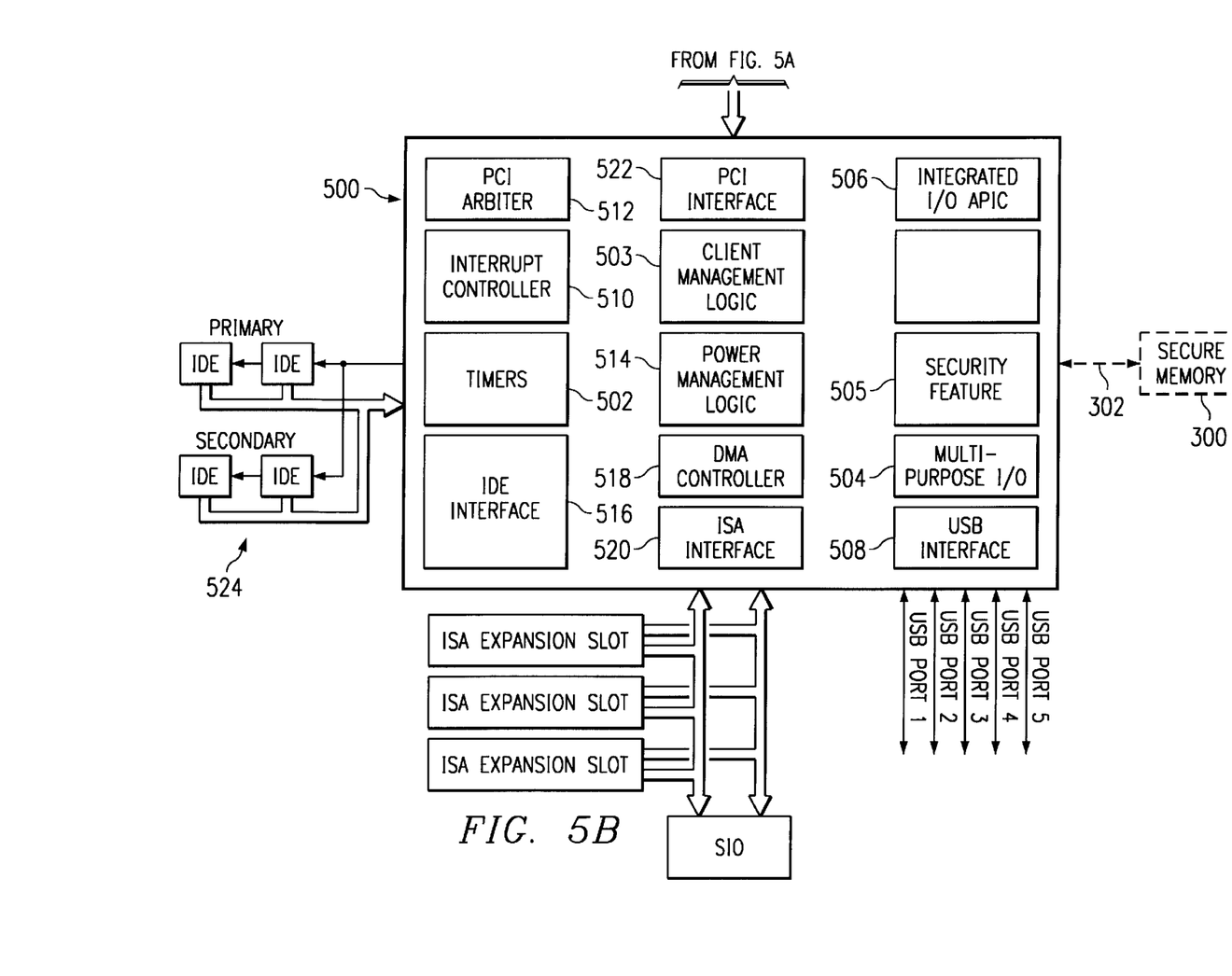

FIGS. 5A and 5B show a generalized block diagram of an innovative Compaq ASIC 500 in the context of a computer system and incorporating the innovative security function. The chip 500 may include a number of south bridge functions, e.g. counter/timer circuitry 502; multi-purpose I/O support 504 which comprises the client management logic 503; integrated APIC I/O 506; USB support 508; interrupt controller 510; PCI arbiter 512; Compaq Enhanced Power Management circuitry 514; IDE device circuitry 516 which interfaces to IDE devices 524; DMA controller 518; an ISA bus bridge 520; and a Bus 0 PCI interface 522. Most importantly, the ASIC includes the disclosed innovative security circuitry 505 which may interface to optionally an external secure memory 300 over a bus 302. The secure memory may also be integrated into the ASIC 500. Also shown is north bridge logic 208 which handles interfacing between the PCI bus and any of a number of system microprocessors CPU1–CPU4.

Figure 6:
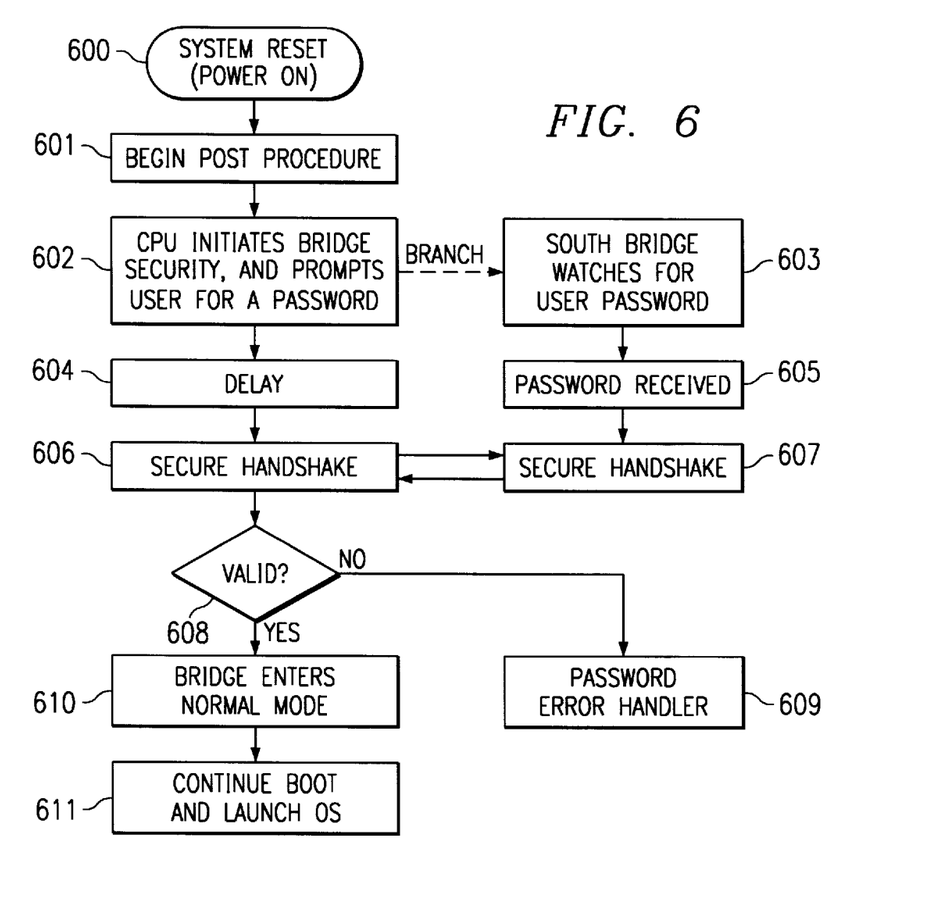
FIG. 6 shows a flowchart of the password verification process.

FIG. 6 shows a flowchart of the password verification process. Upon a system reset or power-on event (Step 600), the system begins the Power On/Self-Test ("POST") procedure (Step 601). The CPU then initiates the security process (Step 602) by signalling the south bridge chip to watch for a user password (Step 603). The CPU may enter into a delay mode (Step 604) while the south bridge chip enters the password mode. The bridge chip receives the user password (Step 605) and performs a secure handshake with the CPU (Steps 606 and 607). Password validation is then performed by the CPU (Step 608) with any errors in validation being handled by a password error handler process (Step 609). Upon successful validation, the bridge chip enters normal mode (e.g. pass-through mode) (Step 610) where it simply performs its transactional function. The system continues the boot process and launches the system operating system (Step 611).

Figure 4:
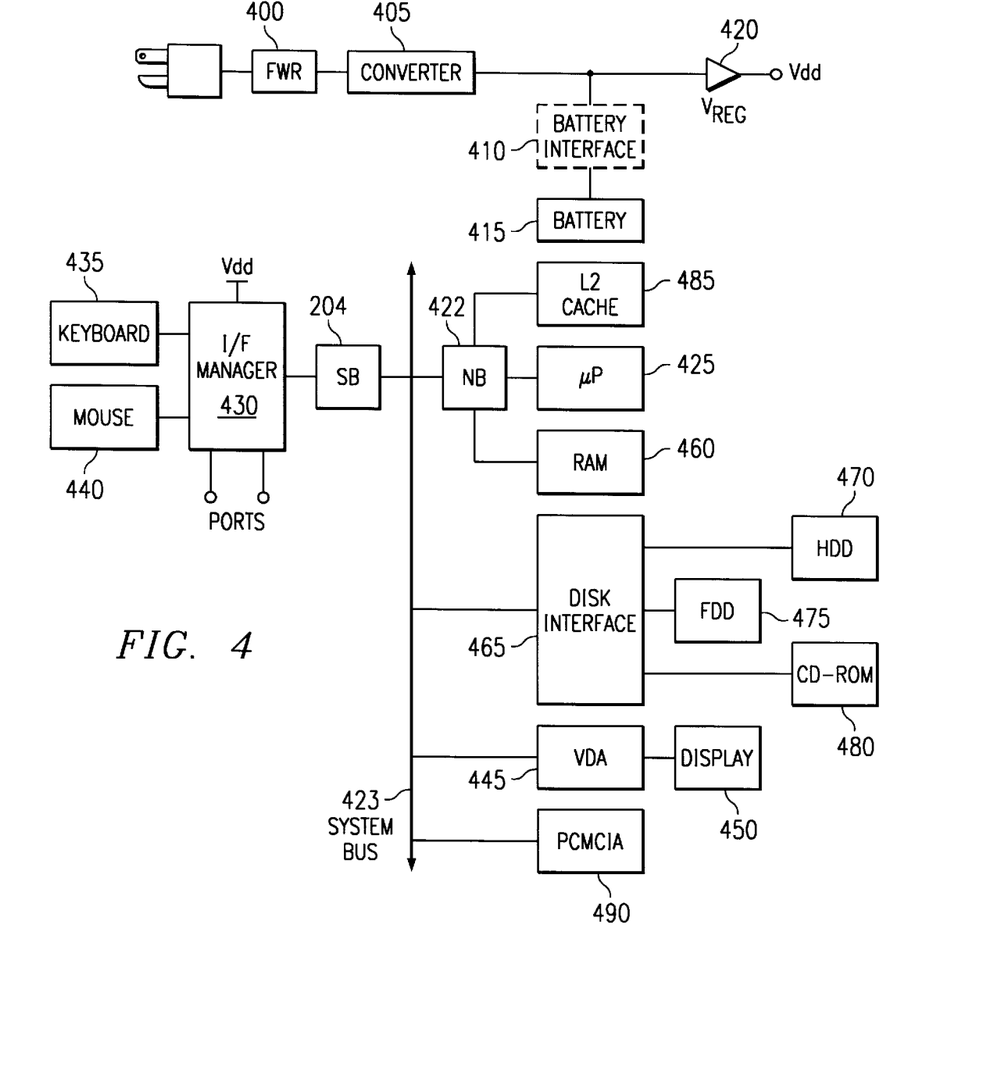
FIG. 4 shows a block diagram of a portable computer with the innovative embodiment.

FIG. 4 shows a sample computer system (portable in this case) which can use the innovative embodiment. The system includes a power converter 405 which is used to charge a battery 415. Optionally, a battery interface 410 is interposed between the battery and the rest of the circuitry. The power converter 405 is connected, through a full-wave bridge rectifier, 400, to draw power from AC mains, and is connected to provide a DC voltage to the battery 415. The battery 415 (or the converter 405), connected through a voltage regulator 420, is able to power the complete portable computer system, which includes in this example:

user input devices (e.g. keyboard 435 and mouse 400);

at least one microprocessor 425 which is operatively connected to receive inputs from an input device, through an interface manager chip 430 (which also provides an interface to the various ports);

a memory (e.g. RAM 460), which is accessible by the microprocessor;

a data output device (e.g. display 450 and video display adapter card 445) which is connected to output data generated by microprocessor;

a magnetic disk drive 470 which is read-write accessible, through an interface unit 465, by the microprocessor; and a Compaq bridge/security ASIC 204 interposed between user input devices 435 and 440, and the microprocessor 425. Additionally, another bridging chip 422 is shown between the microprocessor and the system bus 423 for transaction handling from the microprocessor to other devices.

Optionally, of course, many other components can be included, and this configuration is not definitive by any means. For example, the portable computer may also include a CD-ROM drive 480 and floppy disk drive ("FDD") 475 which may interface to the disk interface controller 465. Additionally, L2 cache 485 may be added to speed data access from the disk drives to the microprocessor, and a PCMCIA 490 slot accommodates peripheral enhancements.

Further details of the system context, and of options for implementation, may be found in the books from MindShare, Inc., entitled PROTECTED MODE SOFTWARE ARCHITECTURE (1996), CARDBUS SYSTEM ARCHITECTURE (2.ed. 1996), EISA SYSTEM ARCHITECTURE (2.ed.), ISA SYSTEM ARCHITECTURE (3.ed.), 80486 SYSTEM ARCHITECTURE (3.ed.), PENTIUM PROCESSOR SYSTEM ARCHITECTURE (2.ed.), PCMCIA SYSTEM ARCHITECTURE (2.ed. 1995), PLUG AND PLAY SYSTEM ARCHITECTURE (1995), PCI SYSTEM ARCHITECTURE (3.ed. 1995), USB SYSTEM ARCHITECTURE (1997), and PENTIUM PRO PROCESSOR SYSTEM ARCHITECTURE (1.ed. 1997, 2.ed. 1997), all of which are hereby incorporated by reference, and in the PENTIUM PROCESSOR FAMILY DEVELOPER'S MANUAL 1997, the MULTIPROCESSOR SPECIFICATION (1997), the INTEL ARCHITECTURE OPTIMIZATIONS MANUAL, the INTEL ARCHITECTURE SOFTWARE DEVELOPER'S MANUAL, the PERIPHERAL COMPONENTS 1996 databook, the PENTIUM PRO PROCESSOR BIOS WRITER'S GUIDE (version 2.0, 1996), and the PENTIUM PRO FAMILY DEVELOPER'S MANUALS from Intel, all of which are hereby incorporated by reference.

ALTERNATIVE EMBODIMENT

Secondary Restricted Access

According to a disclosed class of innovative embodiments the innovative password protection method may be used for providing a secondary restricted access (e.g. administrative privileges). Multiple layers of passwords may be implemented for enabling various levels of access to the system (e.g. full system access, operating system access, and access to particular system components), and the disclosed security architecture can be used for some, but not all of these layers.

Multiple System Boards

According to a disclosed class of innovative embodiments the innovative password protection method may be applied in systems with more than one system board. Multiple system boards (e.g. Single Board Computers) may be employed in servers to enhance fault-tolerant capabilities, or potentially in networking equipment where numerous networks are interconnected. In this instance, multiple south bridge circuits (one in each board) may be required to provide the desired security environment.

Protection Against Password Hacking

According to a disclosed class of innovative embodiments other protection features can be added into the bridge chip to prevent password hacking by repeated bombardment. For example, a wait may be required after 3 unsuccessful access attempts.

Digital Signature Keys

According to a disclosed class of innovative embodiments the innovative password protection method may be used in combination with digital signature relationships to provide even greater protection against snooping of the memory which holds the password-checking data. A user's private key may be more securely protected with the disclosed method.

Diagnostic Bus

According to a disclosed class of innovative embodiments the innovative password protection method may also employ a diagnostic bus from the keyboard controller directly to the south bridge circuitry.

South Bridge Performs Validation

According to a disclosed class of innovative embodiments, the password validation process may be performed in the south bridge.

South Bridge Prohibits CPU Access

According to a disclosed class of innovative embodiments, the password validation may be performed only in the south bridge chip, and access by the CPU to the bridge chip is prohibited.

According to a disclosed class of innovative embodiments, there is provided: a computer system, comprising: at least one user input device and at least one output device; a main system module which does not include said input and output devices, and which includes therein: at least one microprocessor which is operatively connected to detect inputs from said input device and to send data to said output device, and a first memory which is connected to be read/write accessible by said microprocessor; first and second buses connected to said main system module, and having connections through which additional components can communicate with said main system module; and an interface circuit interposed between said first and second buses for the translation of signals therebetween, and a second memory connected to said interface circuit for secure data storage; wherein said input device is on said first bus, and said microprocessor is operatively connected to communicate with said interface circuit through said second bus; wherein said first interface circuit includes logic which, under at least some conditions, checks a password communicated from said user input device against password-checking data stored in a second memory, and conditionally, if said password is not authenticated by said password-checking data, blocks at least some access to said computer system.

According to another disclosed class of innovative embodiments, there is provided: a computer system, comprising: at least one user input device and at least one output device; a main system module which does not include said input and output devices, and which includes therein: one or more microprocessors operatively connected to detect inputs from said input device and to send data to said output device, and a first memory which is connected to be read/write accessible by said microprocessor; first and second busses, and first and second interface circuits, said first interface circuit being interposed between said first and second busses for the translation of signals therebetween, said second interface circuit being interposed between said second bus and said microprocessors for the translation of signals therebetween, said second bus being interposed between said first and second interface circuits, and said first interface circuit being connected to receive signals from said input device through said first bus; wherein said first interface circuit includes logic which, under at least some conditions, checks a password communicated form said user input device against password-checking data stored in a second memory, and conditionally, if said password is not authenticated by said password-checking data, blocks at least some access to said computer system.

According to another disclosed class of innovative embodiments, there is provided: a computer system, comprising: at least one user input device and at least one output device; a main system module which does not include said input and output devices; first and second buses connected to said main system module, and having connections through which additional components can communicate with said main system module; at least one microprocessor on said main system module which is operatively connected to send data to said output device, and which is connected through a local bus to have read/write access to a first memory on said system module; and at least first and second interface circuits; wherein said second interface circuit is interposed between said second and local buses for the translation of signals therebetween, and said first interface circuit is interposed between said first and second buses for the translation of signals therebetween; wherein said first interface circuit includes logic which, under at least some conditions, checks a password communicated from said user input device against password-checking data stored in a second memory, and conditionally, if said password is not authenticated by said password-checking data, blocks at least some access to said computer system.

According to another disclosed class of innovative embodiments, there is provided: a method for providing secure password communications in a computer system, comprising the steps of: (a.) receiving input signals from one or more user input devices across a first bus to a first interface circuit; and (b.) translating signals from said first bus to a second bus, using said first interface circuit; wherein said first interface circuit includes logic which, under at least some conditions, checks a password communicated from said user input device against password-checking data stored in a second memory, and conditionally, if said password is not authenticated by said password-checking data, blocks at least some access to said computer system.

According to another disclosed class of innovative embodiments, there is provided: a method for providing secure password communications in a computer system, comprising the steps of: (a.) receiving input signals from one or more user input devices across a first bus; (b.) translating signals from said first bus to a second bus, using a first interface circuit; and (c.) translating said signals from said second bus to one or more microprocessors, using a second interface circuit; wherein said first interface circuit includes logic which, under at least some conditions, checks a password communicated from said user input device against password-checking data stored in a second memory, and conditionally, if said password is not authenticated by said password-checking data, blocks at least some access to said computer system.

According to another disclosed class of innovative embodiments, there is provided: a method for providing secure password communications in a computer system, comprising the steps of: (a.) receiving input signals from a user input device, which is not on a motherboard, through a first bus; (b.) translating signals from said first bus to a second bus, using a first interface circuit; and (c.) translating said signals from said second bus to a local bus which is connected to one or more microprocessors, using a second interface circuit; wherein said first interface circuit includes logic which, under at least some conditions, checks a password communicated from said user input device against password-checking data stored in a second memory, and conditionally, if said password is not authenticated by said password-checking data, blocks at least some access to said computer system.

Modifications and Variations

As will be recognized by those skilled in the art, the innovative concepts described in the present application can be modified and varied over a tremendous range of applications, and accordingly the scope of patented subject matter is not limited by any of the specific exemplary teachings given.

It should also be noted that the innovative password protection method may be used for enhancing the level of password protection for Device Bay™ locking techniques. See also pending U.S. patent application Ser. No. 08/940, 344, Protected Selective Disabling of Device Bay Interchange, filed Sep. 30, 1997, which is hereby incorporated by reference.

It should also be noted that the innovative password protection method may be adapted to peer-to-peer authentication between systems.

It should also be noted that the innovative password protection method is not restricted only to south bridge architectures, but also may be applied to any other bus-bridging architectures.

It should also be noted that, over time, an increasing number of functions tend to be combined into a single chip. The disclosed inventions can still be advantageous even with different allocations of functions among chips, as long as the functional principles of operation described above are still observed.

It should also be noted that the innovative password protection method may be used in fault-tolerant configurations where redundant systems and components may be employed.

It should also be noted that the disclosed innovative method may be implemented where the secure memory used by the bridge chip for authentication is integrated into the south bridge circuitry.

It should also be noted that the disclosed innovative method may be implemented where the keyboard controller is consolidated into the south bridge circuitry.

It should also be noted that the disclosed innovative method may be implemented as a state machine in a customized south-bridge circuit.

It should also be noted that the disclosed innovative ideas are not limited only to systems using ISA, EISA, Micro Channel, and/or PCI buses, but can also be implemented in systems using other bus architectures.

It should also be noted that the disclosed innovative ideas are not limited only to systems based on an x86-compatible microprocessor, but can also be implemented in systems using 680x0, RISC, or other processor architectures.

It should also be noted that the disclosed innovative ideas are not by any means limited to systems using a single-processor CPU, but can also be implemented in computers using multiprocessor architectures.

It should also be noted that the disclosed innovative ideas are not by any means limited to single-user desktop systems, but are also applicable to network equipment (e.g. hubs, routers, etc.), mainframe transaction processing systems, terminals, engineering workstations, and portable computers to which an external keyboard can be attached.

What is claimed is:

1. A computer system, comprising:
   at least one user input device and at least one output device;
   a main system module which does not include said input and output devices, and which includes therein: at least one microprocessor which is operatively connected to detect inputs from said input device and to send data to said output device, and a first memory which is connected to be read/write accessible by said microprocessor;
   first and second buses connected to said main system module, and having connections through which additional components can communicate with said main system module; and
   a bridge interposed between said first and second buses, said bridge translates signals therebetween, and a second memory connected to said bridge for secure data storage; wherein said input device is on said first bus, and said microprocessor is operatively connected to communicate with said bridge through said second bus;
   wherein said bridge includes logic which, under at least some conditions, checks a password communicated from said user input device against password-checking data stored in said second memory, and conditionally, if said password is not authenticated by said password-checking data, blocks at least some access to said computer system.

2. The computer system of claim 1, wherein, if said password is not authenticated, said logic cuts off signal transmission from said first bus to said second bus.

3. The computer system of claim 1, wherein said second memory is not integrated with said bridge, and is connected only to said bridge.

4. The computer system of claim 1, wherein said second memory is flash memory.

5. The computer system of claim 1, wherein said second memory is integrated with said bridge.

6. The computer system of claim 1, wherein said computer system is a portable computer.

7. The computer system of claim 1, wherein said input device is a smart card reader.

8. The computer system of claim 1, wherein said input device is a keyboard.

9. The computer system of claim 1, wherein said input device is a fingerprint reader.

10. The computer system of claim 1, wherein access to said computer is blocked after a number of unsuccessful login attempts.

11. The computer system of claim 1, wherein said second memory stores more than one password.

12. The computer system of claim 1, wherein said first bus is an Industry Standard Architecture bus.

13. The computer system of claim 1, wherein said first bus is a Universal Serial Bus.

14. The computer system of claim 1, wherein said first bus is a 1394 serial bus.

15. The computer system of claim 1, wherein said second bus is a Peripheral Component Interconnect bus.

16. The computer system of claim 1, wherein said password-checking data consists of the expected value of the password.

17. A computer system, comprising:
   at least one user input device and at least one output device;
   a main system module which does not include said input and output devices, and which includes therein: one or more microprocessors operatively connected to detect inputs from said input device and to send data to said output device, and a first memory which is connected to be read/write accessible by said one or more microprocessors;
   first and second busses, and first and second bridges, said first bridge being interposed between said first and second busses for the translation of signals therebetween,
   said second bridge being interposed between said second bus and said microprocessors for the translation of signals therebetween,
   said second bus being interposed between said first and second bridges, and
   said first bridge being connected to receive signals from said input device through said first bus;
   wherein said first bridge includes logic which, under at least some conditions, checks a password communicated from said user input device against password-checking data stored in a second memory, and conditionally, if said password is not authenticated by said password-checking data, blocks at least some access to said computer system.

18. The computer system of claim 17, wherein said second memory is not integrated with said first bridge, and is connected only to said first bridge.

19. The computer system of claim 17, wherein said second memory is flash memory.

20. The computer system of claim 17, wherein said second memory is integrated with said first bridge.

21. The computer system of claim 17, wherein said input device is a keyboard.

22. The computer system of claim 17, wherein said input device is a voice recognition system.

23. The computer system of claim 17, wherein said first bridge stores enabler bits used for securing system functions.

24. The computer system of claim 17, wherein said first bridge stores enabler bits for a hoodlocking function.

25. The computer system of claim 17, wherein access to said computer is blocked after a number of unsuccessful login attempts.

26. The computer system of claim 17, wherein said first bus is a Universal Serial Bus.

27. The computer system of claim 17, wherein said first bus is a 1394 serial bus.

28. The computer system of claim 17, wherein said password-checking data consists of the expected value of the password.

29. A computer system, comprising:
   at least one user input device and at least one output device;
   a main system module which does not include said input and output devices;
   first and second buses connected to said main system module, and having connections through which additional components can communicate with said main system module;
   at least one microprocessor on said main system module which is operatively connected to send data to said output device, and which is connected through a local bus to have read/write access to a first memory on said system module; and
   at least first and second bridges; wherein said second bridge is interposed between said second and local buses for the translation of signals therebetween, and said first bridge is interposed between said first and second buses for the translation of signal therebetween; wherein said first bridge includes logic which, under at least some conditions, checks a password communicated from said user input device against password-checking data stored in a second memory, and conditionally, if said password is not authenticated by said password-checking data, blocks at least some access to said computer system.

30. The computer system of claim 29, wherein said computer system is a portable computer.

31. The computer system of claim 29, wherein said input device is a smart card reader.

32. The computer system of claim 29, wherein said input device is a fingerprint reader.

33. The computer system of claim 29, wherein said second memory stores more than one password.

34. The computer system of claim 29, wherein said second bus is a Peripheral Component Interconnect bus.

35. The computer system of claim 29, wherein said second bus has more than four times as much bandwidth as said first bus.

36. A method for providing secure password communications in a computer system, comprising:
   (a.) receiving input signals from one or more user input devices across a first bus to a bridge; and
   (b.) translating signals from said first bus to a second bus, using said bridge;
   wherein said bridge includes logic which, under at least some conditions, checks a password communicated from said user input device against password-checking data stored in a second memory, and conditionally, if said password is not authenticated by said password-checking data, blocks at least some access to said computer system.

37. The method of claim 36, wherein said second memory is not integrated with said bridge, and is connected only to said bridge.

38. The method of claim 36, wherein said second memory is flash memory.

39. The method of claim 36, wherein said second memory is integrated with said bridge.

40. The method of claim 36, wherein said input device is a smart card reader.

41. The method of claim 36, wherein said input device is a voice recognition system.

42. The method of claim 36, wherein said bridge stores enabler bits used for securing system functions.

43. The method of claim 36, wherein said bridge stores enabler bits for a hoodlocking function.

44. The method of claim 36, wherein said computer system comprises more than one interface circuit.

45. The method of claim 36, wherein access to said computer is blocked after a number of unsuccessful login attempts.

46. The method of claim 36, wherein said first bus is an Industry Standard Architecture bus.

47. The method of claim 36, wherein said first bus is a Universal Serial Bus.

48. The method of claim 36, wherein said password-checking data consists of the expected value of the password.

49. A method for providing secure password communications in a computer system, comprising:
   (a.) receiving input signals from one or more user input devices across a first bus;
   (b.) translating signals from said first bus to a second bus, using a bridge; and
   (c.) translating said signals from said second bus to one or more microprocessors, using a second bridge;
   wherein said bridge includes logic which, under at least some conditions, checks a password communicated from said user input device against password-checking data stored in a second memory, and conditionally, if said password is not authenticated by said password-checking data, blocks at least some access to said computer system.

50. The method of claim 49, wherein said second memory is not integrated with said first bridge, and is connected only to said first bridge.

51. The method of claim 49, wherein said computer system is a portable computer.

52. The method of claim 49, wherein said input device is a smart card reader.

53. The method of claim 49, wherein said input device is a keyboard.

54. The method of claim 49, wherein said input device is a finger-print reader.

55. The method of claim 49, wherein access to said computer is blocked after a number of unsuccessful login attempts.

56. The method of claim 49, wherein said first bus is an Industry Standard Architecture bus.

57. The method of claim 49, wherein said first bus is a 1394 serial bus.

58. A method for providing secure password communications in a computer system, comprising:
   (a.) receiving input signals from a user input device, which is not on a motherboard, through a first bus;
   (b.) translating signals from said first bus to a second bus, using a first bridge; and
   (c.) translating said signals from said second bus to a local bus which is connected to one or more microprocessors, using a second bridge;
   wherein said first bridge includes logic which, under at least some conditions, checks a password communicated from said user input device against password-checking data stored in a second memory, and conditionally, if said password is not authenticated by said password-checking data, blocks at least some access to said computer system.

59. The method of claim 58, wherein said second memory is not integrated with said first bridge, and is connected only to said first bridge.

60. The method of claim 58, wherein said second memory is integrated with said first bridge.

61. The method of claim 58, wherein said input device is a voice recognition system.

62. The method of claim 58, wherein said first bridge stores enabler bits used for securing system functions.

63. The method of claim 58, wherein said first bridge stores enabler bits for a hoodlocking function.

64. The method of claim 58, wherein said second memory stores more than one password.

65. The method of claim 58, wherein said first bus is a Universal Serial Bus.

66. The method of claim 58, wherein said second bus is a Peripheral Component Interconnect bus.

* * * * *